Figure 1:
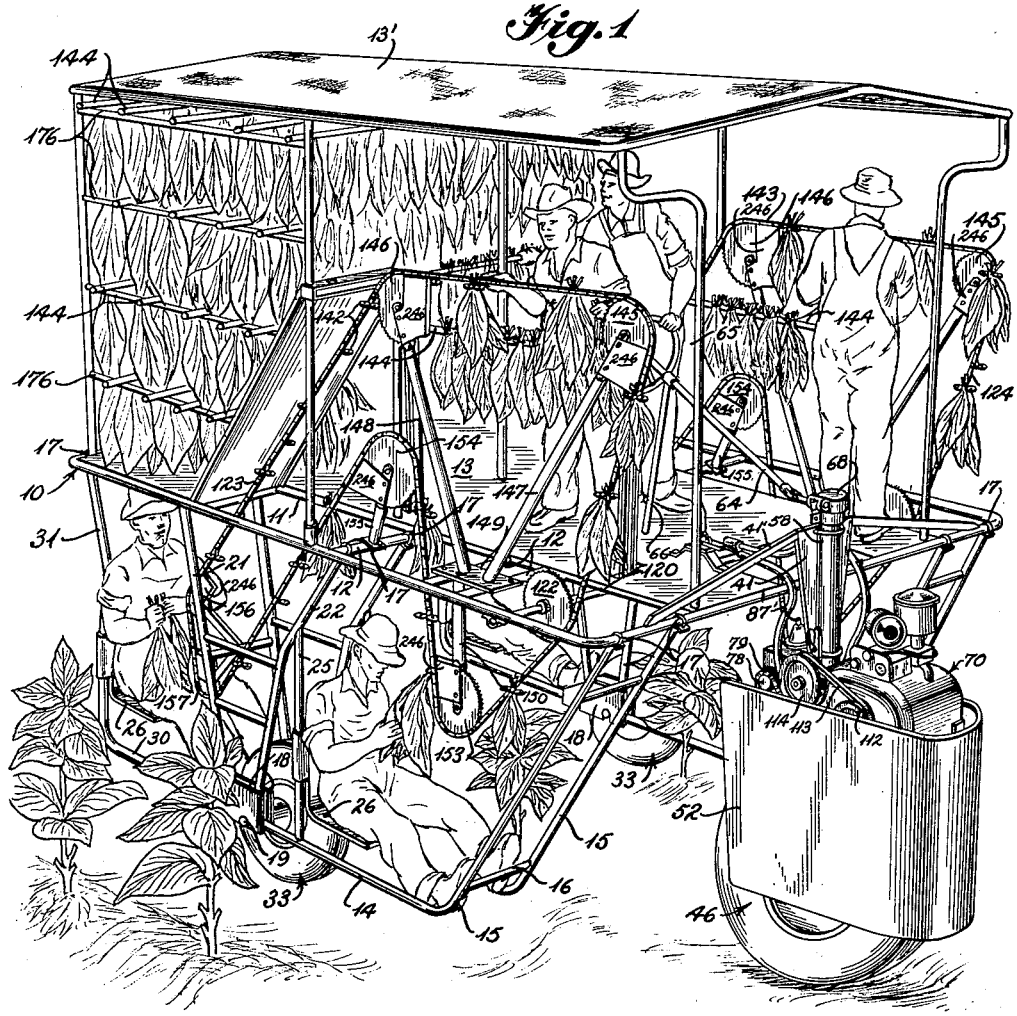

March 15, 1955 W. R. LONG 2,704,158
TOBACCO HARVESTER
Filed July 28, 1954 10 Sheets-Sheet 1

INVENTOR
W. R. Long
BY
ATTORNEY

March 15, 1955 W. R. LONG 2,704,158
TOBACCO HARVESTER
Filed July 28, 1954 10 Sheets-Sheet 2

INVENTOR
W. R. Long
BY
ATTORNEY

March 15, 1955 W. R. LONG 2,704,158
TOBACCO HARVESTER
Filed July 28, 1954 10 Sheets-Sheet 3
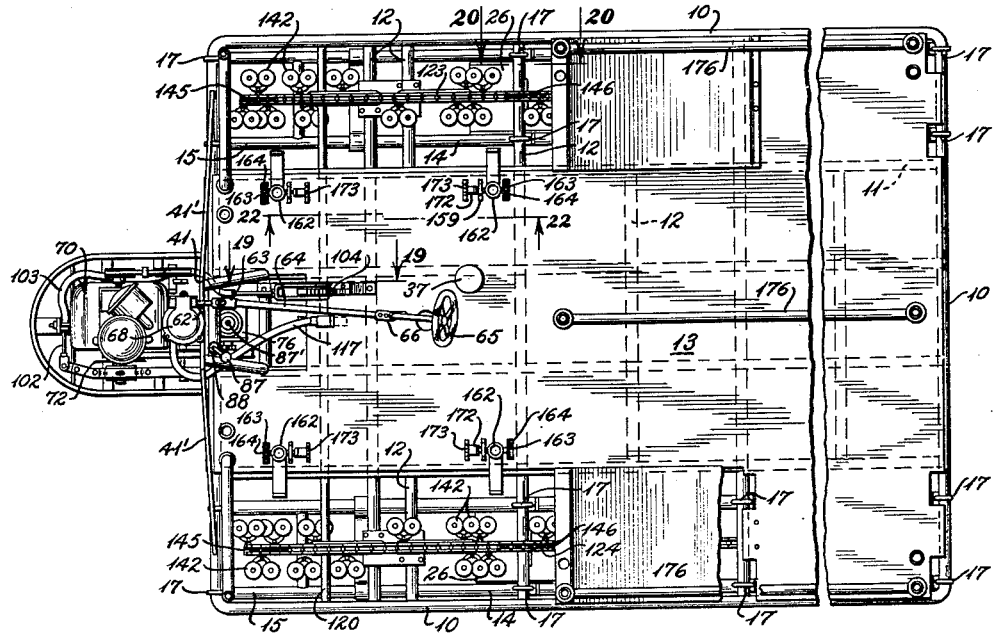
Fig. 3
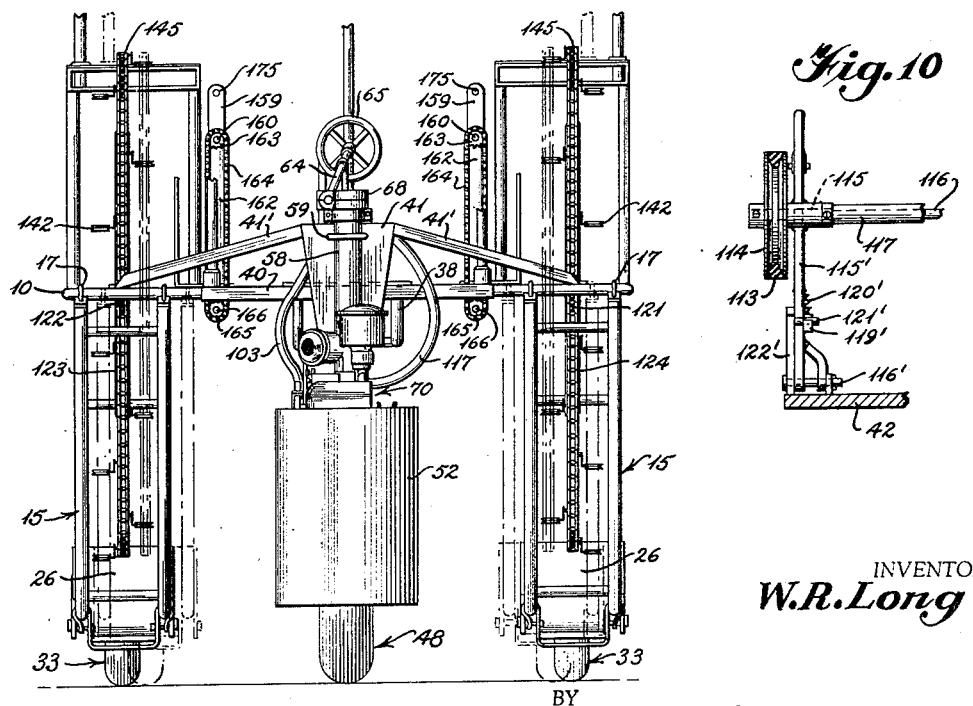
Fig. 4
Fig. 10
INVENTOR
W. R. Long
BY
ATTORNEY

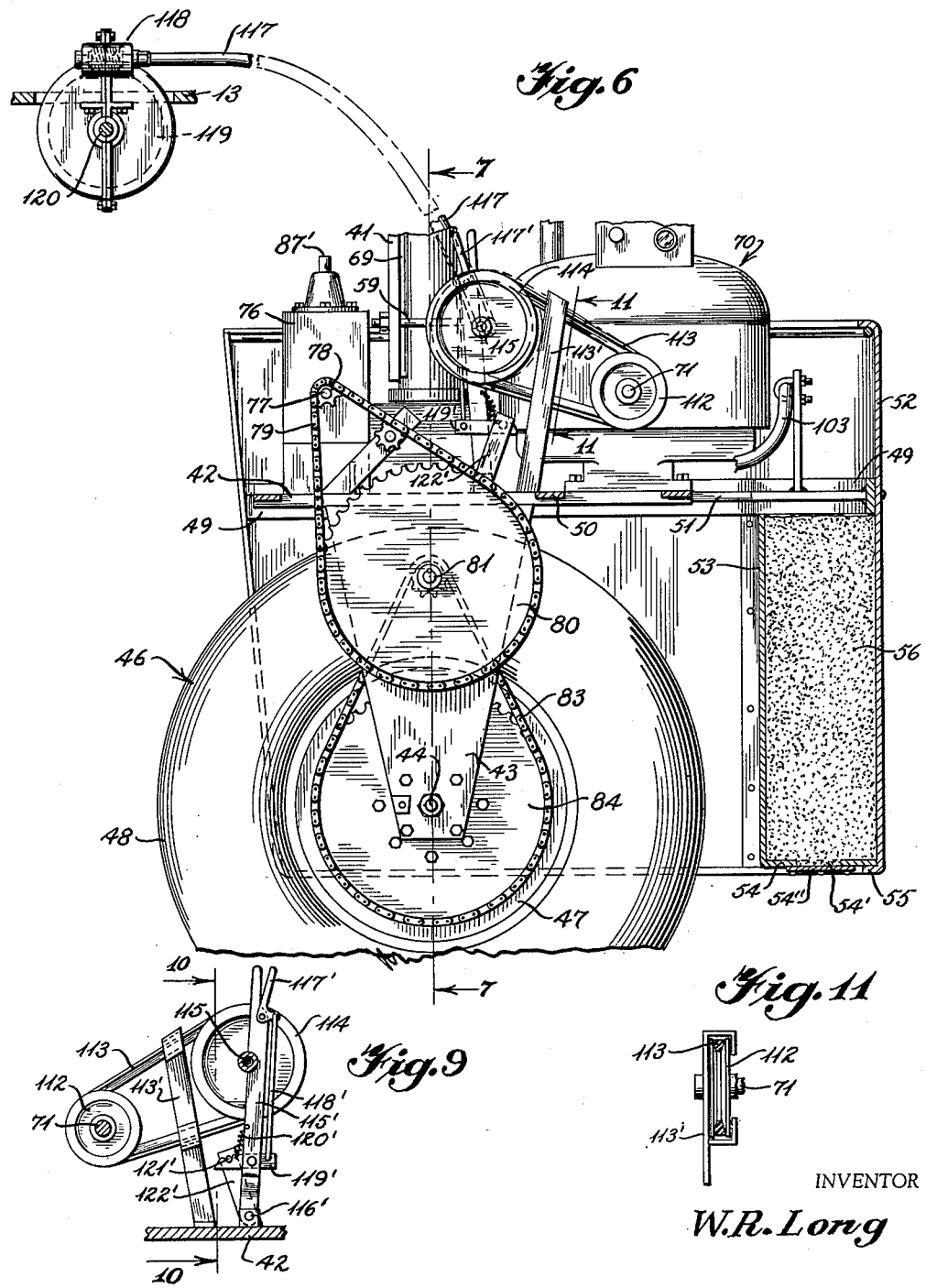

March 15, 1955 — W. R. LONG — 2,704,158
TOBACCO HARVESTER
Filed July 28, 1954 — 10 Sheets-Sheet 5

INVENTOR
W. R. Long
BY
A. Yates Dowell
ATTORNEY

March 15, 1955 W. R. LONG 2,704,158
TOBACCO HARVESTER
Filed July 28, 1954 10 Sheets-Sheet 6
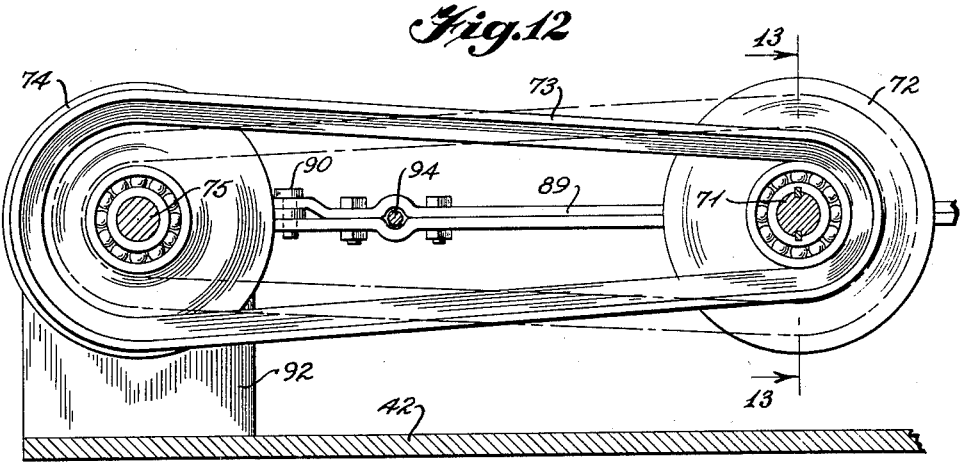
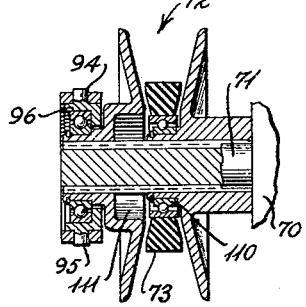
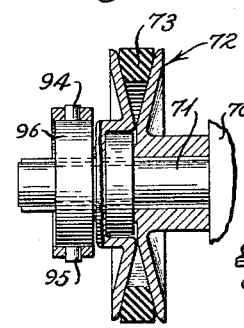
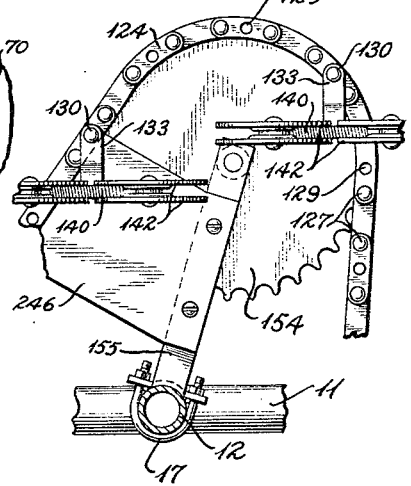
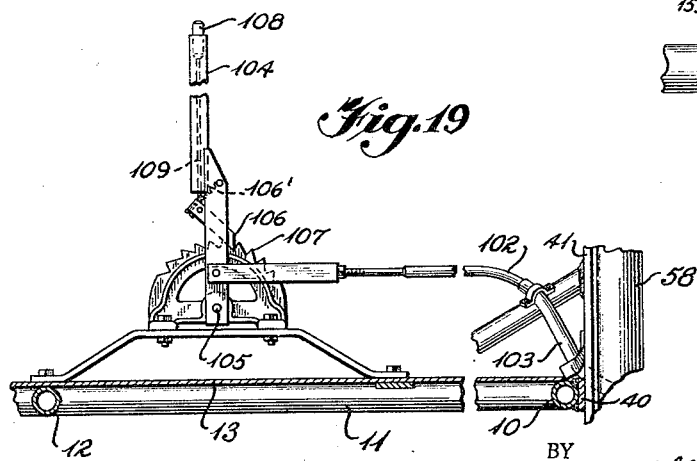
INVENTOR
W. R. Long
BY
ATTORNEY March 15, 1955 W. R. LONG 2,704,158
TOBACCO HARVESTER
Filed July 28, 1954 10 Sheets-Sheet 7
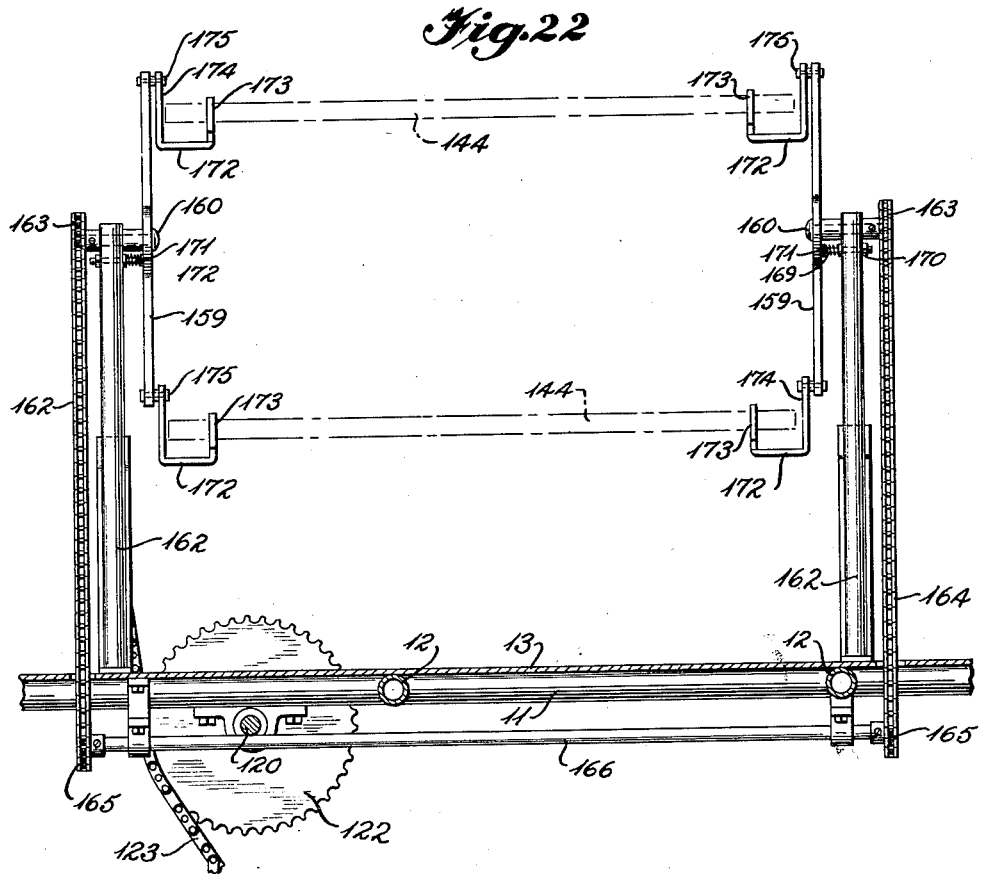
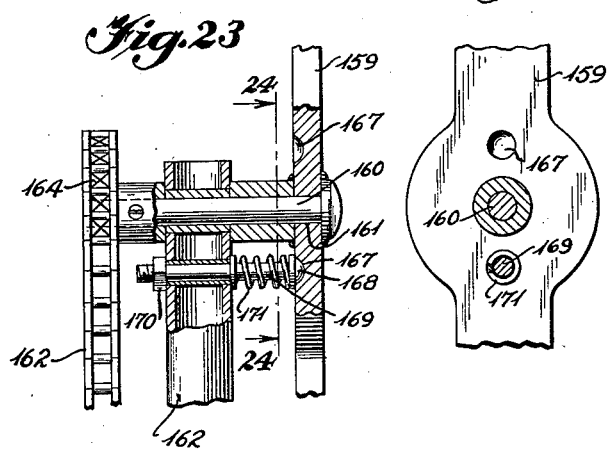
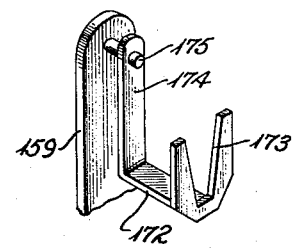
INVENTOR
W. R. Long
BY
ATTORNEY March 15, 1955

W. R. LONG 2,704,158

TOBACCO HARVESTER

Filed July 28, 1954

10 Sheets-Sheet 8

INVENTOR
W. R. Long

BY
ATTORNEY

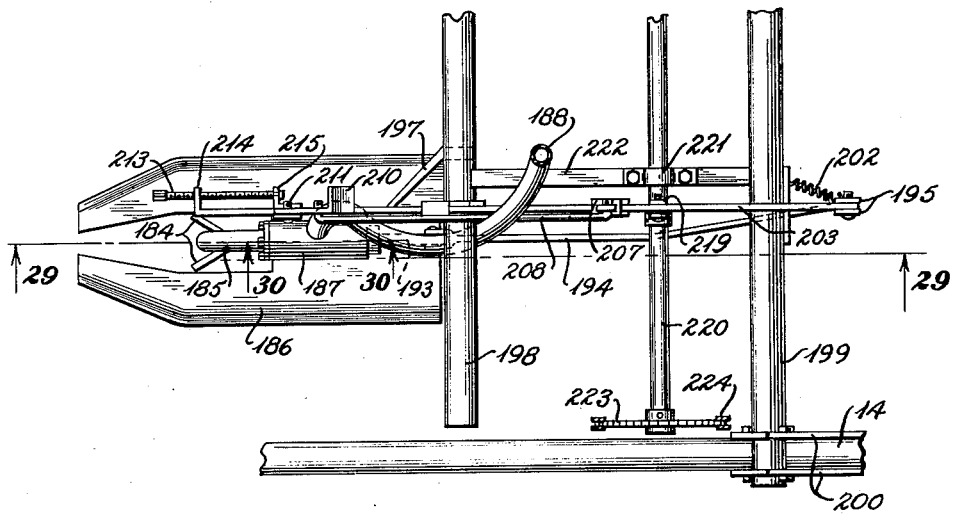
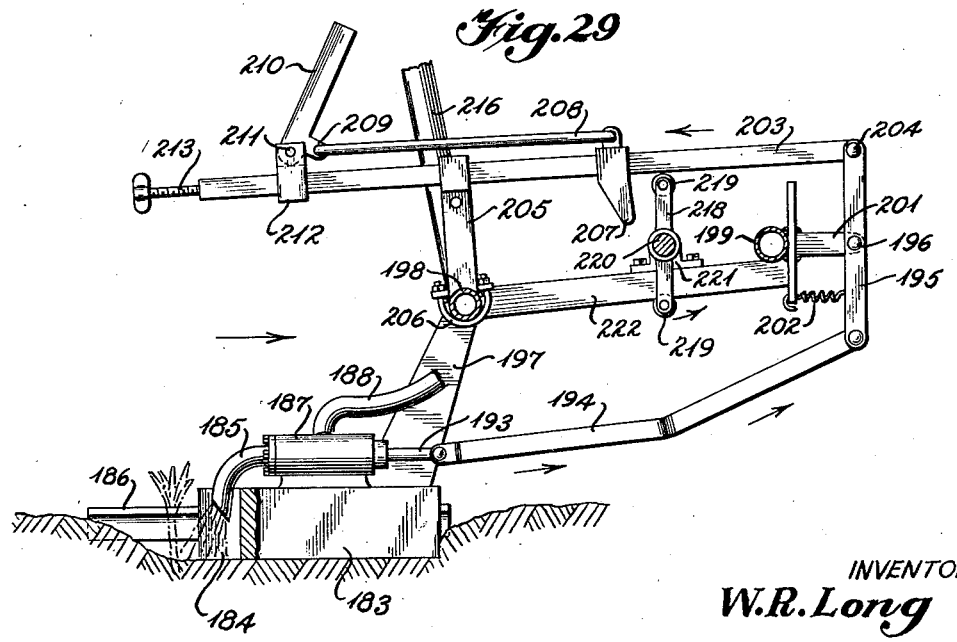

March 15, 1955

W. R. LONG 2,704,158

TOBACCO HARVESTER

Filed July 28, 1954

10 Sheets-Sheet 10

INVENTOR
W.R.Long

BY

ATTORNEY

United States Patent Office 2,704,158
Patented Mar. 15, 1955

2,704,158

TOBACCO HARVESTER

William R. Long, Tarboro, N. C., assignor to Long Manufacturing Co., Inc., Tarboro, N. C.

Application July 28, 1954, Serial No. 446,291

8 Claims. (Cl. 214—5.5)

This invention relates to the treatment of the soil including the planting, transplanting, cultivating, spraying, dusting and harvesting of tobacco and other products where the amount of labor and time consumed are important and influence to a great degree the acreage cultivated as well as the cost of the harvested product and the manufactured end product.

The labor and time required for the cultivating, harvesting, and caring for certain crops has presented such a problem that the farmer has had to limit materially the planting of these crops, such as tobacco, and particularly since prices, including those paid for wages to farm hands, have increased greatly.

Frequently crops such as tobacco ripen rapidly making it necessary to harvest the same in a comparatively short time in order to obtain a yield of the highest quality. This has required a large number of laborers in the planting, cultivating, and harvesting processes and where it has been necessary to spray the growing plants with powder or liquid the burden has been proportionately greater.

Not only has work involved required time and effort but among other things has been tiresome, backbreaking, and expensive. Transplanting has required a great amount of labor and frequently has been done by hand. In cultivating crops it has been necessary for persons to walk along the rows and perform certain tasks such as removing suckers from the stalks of growing plants and sometimes leaves touching the ground or which are unprotected as when cultivating tobacco.

When leaves of tobacco have matured and ripened it is necessary that they be pulled or removed from the stalks. In certain sections as for example in the southern part of the United States the lower leaves of tobacco ripen first and are removed in their prime condition by persons who are referred to as primers. The gathering or harvesting of the tobacco is usually accomplished by having a mule or horse pull a tobacco truck with a stake body and retaining burlap along and between rows of tobacco with a driver and two workmen or primers who walk between adjacent rows one primer at each side of the truck and the ripe leaves from two rows of tobacco are pulled from the stalks and placed on the truck. It then has been necessary to transport the tobacco to the barn for curing, the leaves being tied on sticks to facilitate handling and suspension between rafters during curing. The entire process has been slow, tiresome, laborious, and expensive.

Attempts have been made to provide machines for use in tobacco harvesting which would reduce to a substantial degree the labor and expense involved. These have not been satisfactory because they were too complicated, they failed to efficiently perform the service for which they were created, and were too expensive, as well as objectionable for other reasons.

It is an object of the invention to provide a practical, relatively inexpensive, durable, self-propelled machine, capable of being used in a number of ways on the farm including in the transplanting, cultivating, including spraying or dusting, and harvesting of tobacco and other crops, and by the use of which a greater amount of work can be accomplished with less labor and with less fatigue and effort on the part of the workman, and with which women as well as men may be used in the numerous operations due to the reduction in the strenuousness of the work made possible by the use of the machine.

Another object of the invention is to provide a self-propelled machine which can be adjusted longitudinally for use on either level or hilly soil to change the weight on the traction wheel, in which the other wheels can be adjusted transversely to conform to the different widths or spacings of the rows in which the speed of the machine can be controlled in accordance with the work performed and the density or sparcity of the product planted, cultivated, or harvested, as well as a machine which will travel without being steered from one end of a row to the other end, thus permitting the driver to perform other operations during the traversing of the rows, as for example during the harvesting process, such as placing sticks on which the leaves of tobacco have been strung on the storage racks of the vehicle for subsequent removal for transportation to a barn for curing.

Another object of the invention is to provide a machine of the character specified having endless conveyors at each side of the machine with portions located to facilitate loading convenient to seats for workmen along the lower portions of the sides of the machine and with upper substantially horizontal runs along the upper portion of the machine convenient to workmen on a platform in the upper part of the machine to permit the removal of the tobacco from the conveyors as well as a rotatable rack for sticks onto which tobacco can be readily tied while the leaves are retained in a pendant position and the filled sticks removed and placed in storage racks.

A further object of the invention is to provide a machine which can be used in the performance of numerous tasks on the farm including the spraying of crops and the like.

Another object of the invention is to provide a machine of the character indicated driven from an engine or power plant from which the conveyors likewise are driven, such power plant being set to operate at a desired constant speed and the conveyors operated at a constant speed but with a driving mechanism for the machine variable to change the speed of travel of the machine to suit the requirements.

A still further object of the invention is to provide a machine of the character described in which seats for workmen can be adjusted vertically to suit conditions, as well as a machine which can be rapidly produced, easily shipped, and quickly assembled and put into operation.

Figures 18, 21:
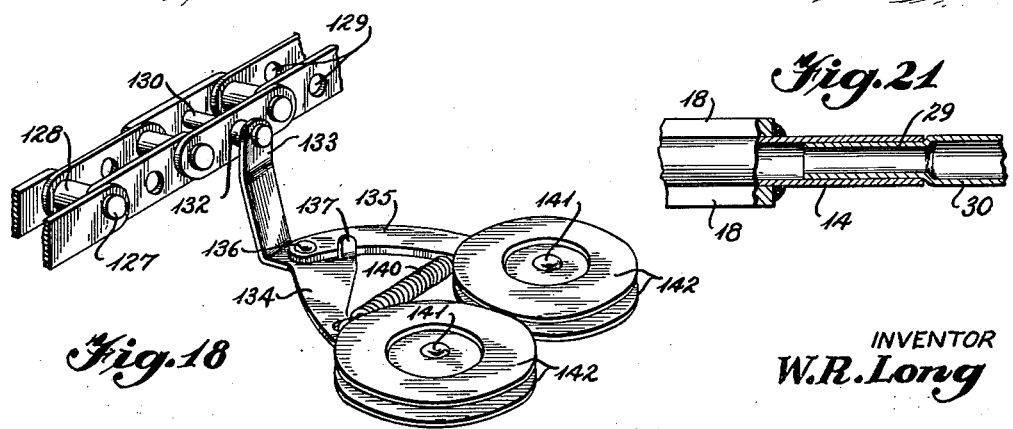
Figure 2:
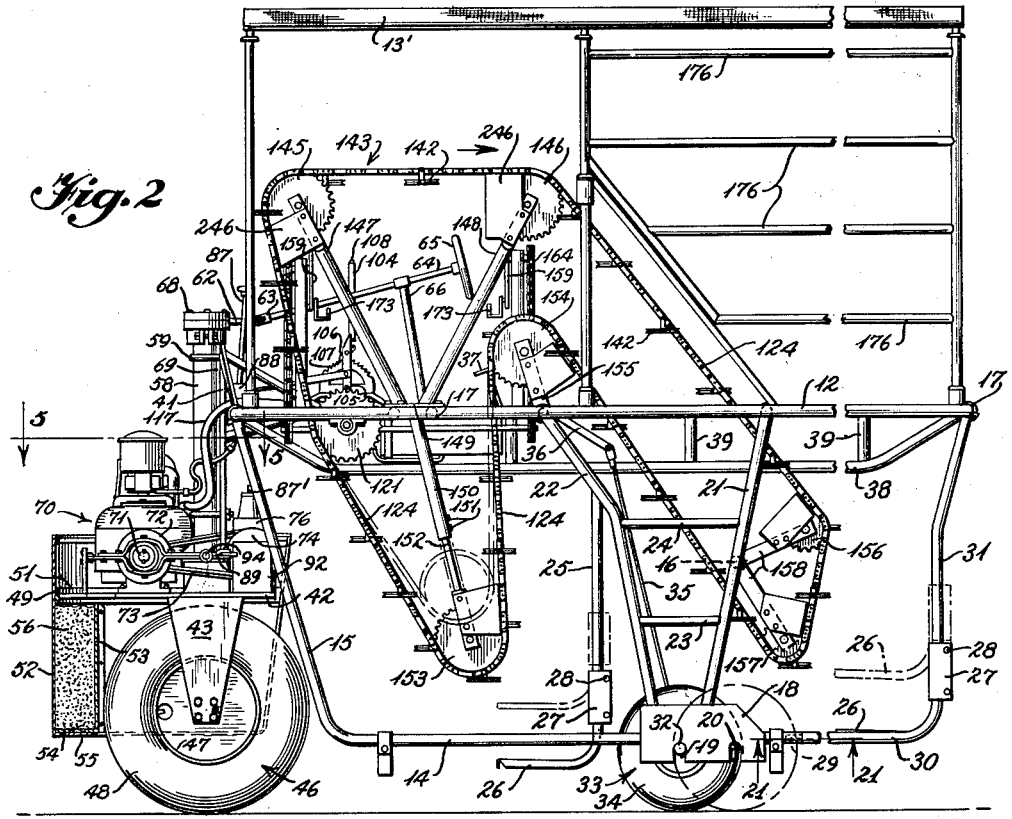
Figure 5:
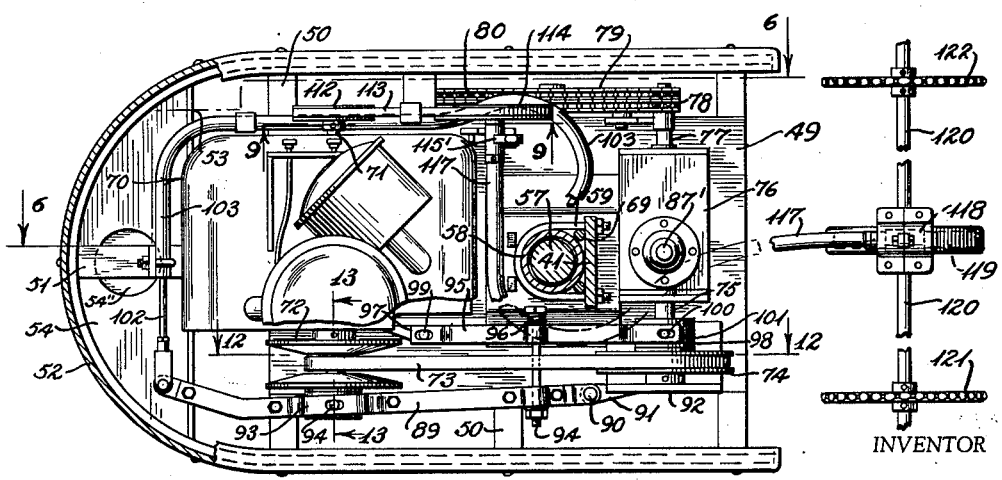
Figure 7:
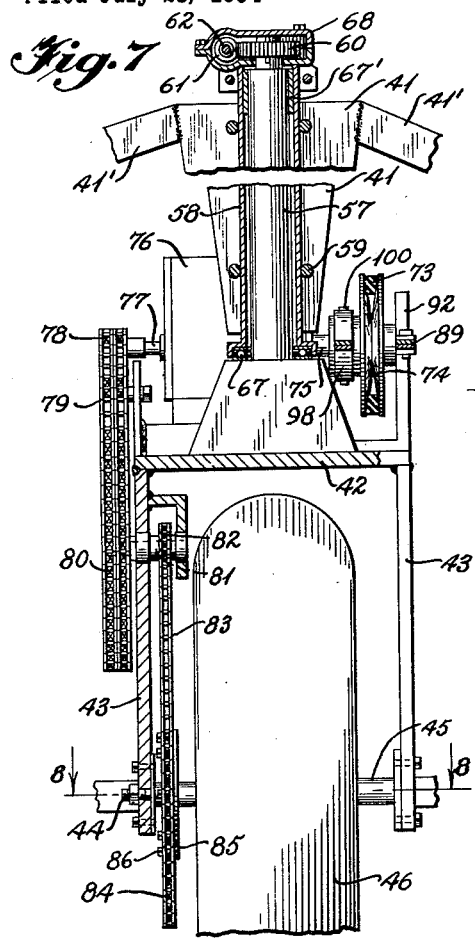
Figure 15:
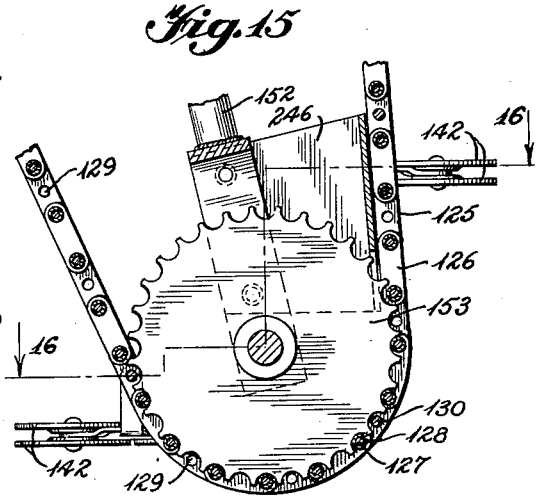
Figure 16:
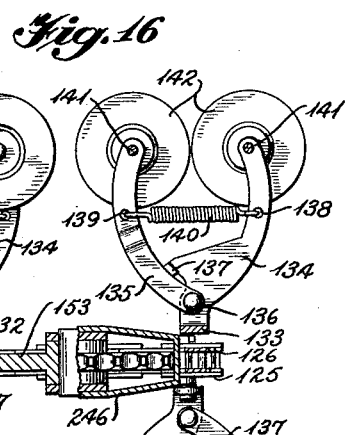
Figure 8:
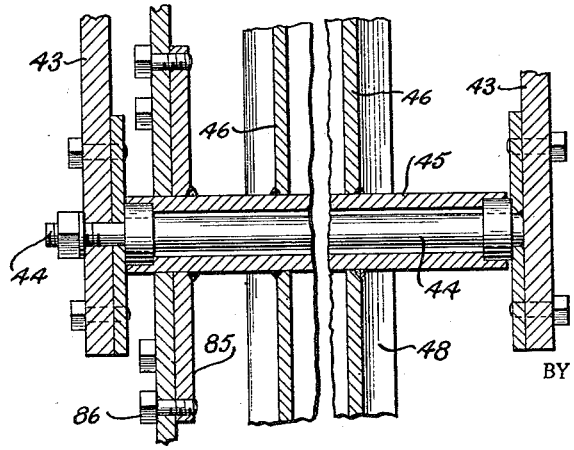
Figure 17:
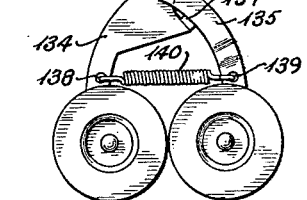
Figure 26:
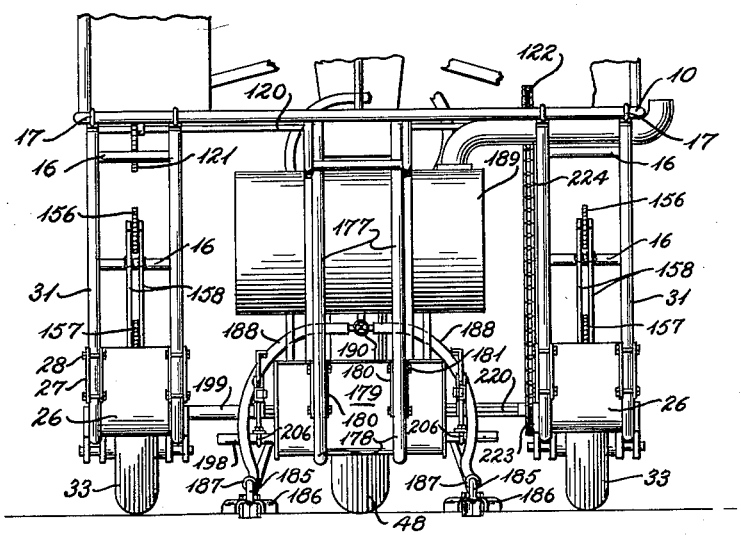
Figure 27:
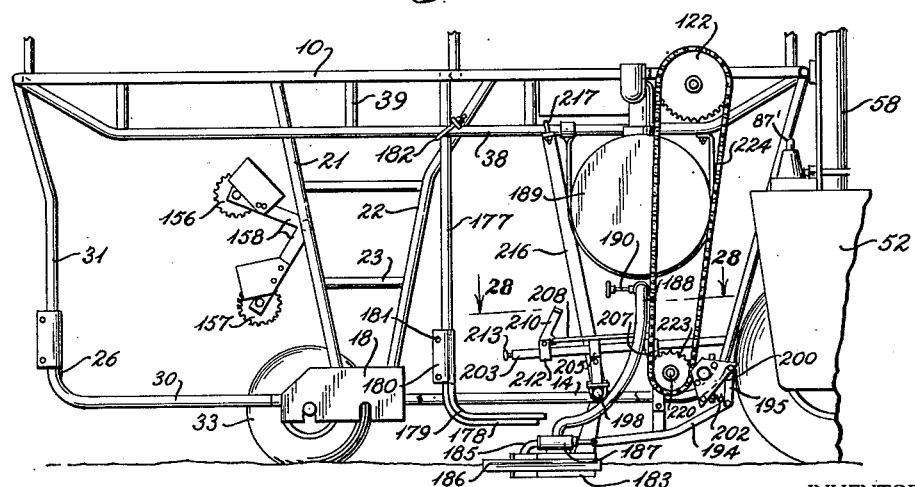
Figure 30:
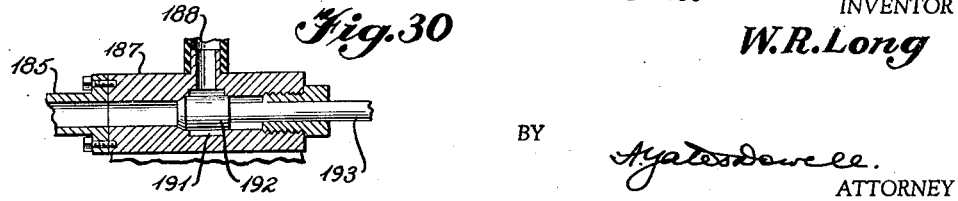
Figure 31:
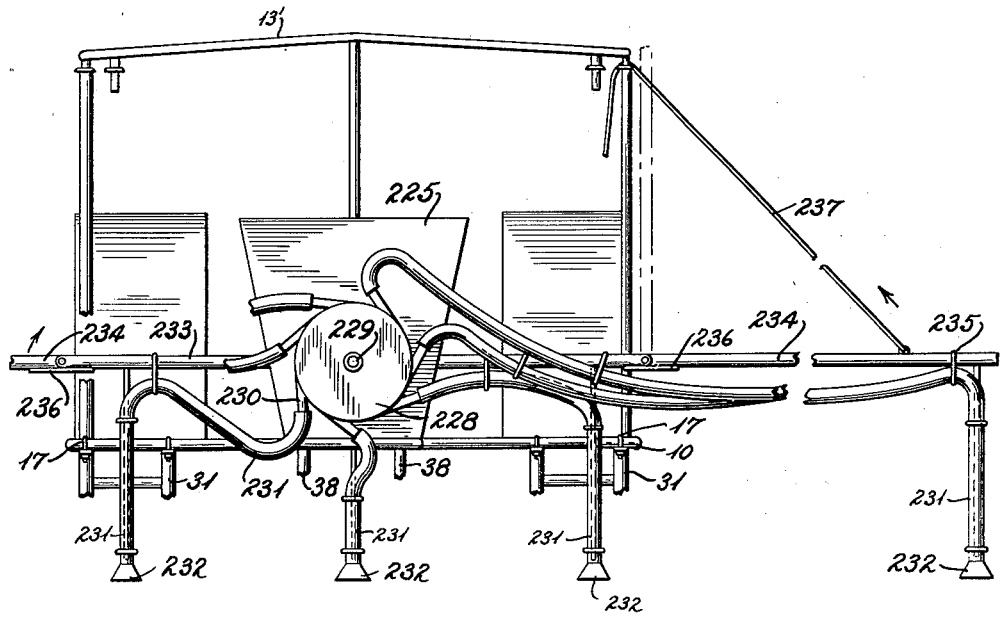
Figure 32:
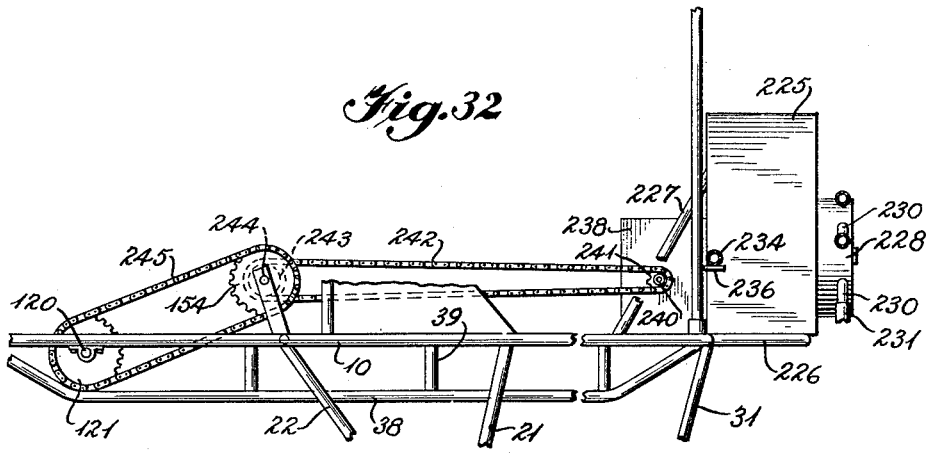

Other objects and advantages will become apparent from the following description taken in conjunction with the accompanying drawings wherein:

Fig. 1 is a perspective illustrating one application of the invention and its use in the harvesting of tobacco;
Fig. 2, a side elevation;
Fig. 3, a top plan view with the canopy removed;
Fig. 4, a front elevation of the lower portion of the machine with the canopy removed;
Fig. 5, a section on the line 5—5 of Fig. 2;
Fig. 6, an enlarged fragmentary section on the line 6—6 of Fig. 5;
Fif. 7, a section on the line 7—7 of Fig. 6;
Fig. 8, an enlarged fragmentary section on the line 8—8 of Fig. 7;
Fig. 9, a fragmentary section on the line 9—9 of Fig. 5;
Fig. 10, a section on the line 10—10 of Fig. 9;
Fig. 11, a section on the line 11—11 of Fig. 6;
Fig. 12, a section on the line 12—12 of Fig. 5;
Fig. 13, a section on the line 13—13 of Fig. 5;
Fig. 14, a fragmentary section of the drive pulley in its closed or high-speed driving position;
Fig. 15, a section on the line 15—15 of Fig. 4;
Fig. 16, a fragmentary section on the line 16—16 of Fig. 5;
Fig. 17, an enlarged detail on the line 17—17 of Fig. 16;
Fig. 18, an enlarged perspective of the tobacco gripping clamp or clip and a fragment of the chain from which it is suspended;
Fig. 19, a side elevation of the control lever taken on the lines 19—19 of Fig. 3;
Fig. 20, a fragmentary detail taken on the lines 20—20 of Fig. 3;

Fig. 21, a fragmentary section taken on the line 21—21 of Fig. 2;

Fig. 22, a fragmentary section on the line 22—22 of Fig. 3;

Fig. 23, an enlarged detail of the rack locking means of Fig. 22;

Fig. 24, a section on the line 24—24 of Fig. 23;

Fig. 25, a perspective of one of the stick-holding members of Fig. 22;

Fig. 26, a rear elevation of the machine equipped with a transplanter;

Fig. 27, a side elevation with parts broken away to reveal the transplanter of Fig. 26;

Fig. 28, a horizontal section on line 28—28 of Fig. 27 disclosing one of the transplanting and water feeding units;

Fig. 29, an enlarged detail of the transplanter taken on the line 29—29 of Fig. 28;

Fig. 30, a longitudinal section through one of the water valves of the transplanter;

Fig. 31, a fragmentary rear elevation of the upper part of the machine equipped with a plant dusting system; and Fig. 32, a schematic side elevation illustrating the driving means for the duster of Fig. 31.

With continued reference to the drawings, the machine of the present invention comprises a rectangular frame 10 including longitudinal and transverse members 11 and 12 comprising a support or floor 13 providing a platform for workmen. A canopy 13' may be provided to cover the platform 13 to shield the workmen from the weather. The members 10, 11 and 12 are preferably of tubing and the frame with its platform is supported by auxiliary frames including a pair of spaced horizontal members or bars 14 having upwardly inclined forward portions 15 connected by a pair of transverse bars 16. The auxiliary frames are connected to the main frame by means of U-clamps 17 at their upper ends.

The spaced parallel horizontal tubular members 14 each are provided with a pair of spaced plates 18 clamped on opposite sides of each tubular bar 14, such plates having axle-receiving sockets 19 and 20.

Extending between the plates 18 and connected to the main frame are a pair of upright supports 21 and 22, connected by braces 23 and 24, the upper ends of which braces 21 and 22 are connected by the U-clamps 17 with the transverse members 12 of the main frame and afford adjustment laterally of the machine to correspond to the spacing of the rows along which the machine is operated.

The brace 22 is bent slightly relative to its lower portion and has welded or otherwise attached thereto and to the auxiliary frame member 14 an additional brace thus adding rigidity to the structure and providing a support on which seats 26 are adjustably secured by means of clamping sleeves 27 and bolts 28.

The tubular auxiliary frame members 14 terminate a short distance beyond the rear ends of the plates 18 and serve to receive the ends 29 of extension members 30 (Figs. 2 and 21) having upstanding portions 31 which connect by U-clamps 17 to the rear of the frame 10 and on which they can be adjusted as previously indicated. A second seat 26 is adjustable on the upright 31 of each auxiliary frame.

In order to support the main frame toward its rear an axle 32 is disposed transversely of the auxiliary frame in the sockets 19 in the plates 18 and on the axle 32 is mounted a wheel 33 having a pneumatic tire 34 thereon. A wheel 33 is disposed at each side of the vehicle and is provided with a conventional mechanical brake controlled by a link 36 operated by a conventional foot pedal 37. These brakes may be used particularly when the machine is being operated along a highway in moving from place to place.

The frame may be provided with a pair of spaced parallel reinforcing bars 38 (Fig. 2) connected by struts 39 to the under side of the frame. On the front of the main frame, welded or otherwise secured, is a reinforcing bar 40 and to this is attached a triangular plate 41 reinforced at its upper end by braces 41'. The plate 41 is welded or otherwise secured to the bar 40 and frame 10. A horizontal platform 42 is provided having depending tapered side members 43 forming a fork within which is disposed an axle 44 on which a housing 45 of a wheel is supported, such wheel including plates 46 welded or otherwise secured to the housing and to a conventional rim 47 on which is mounted a relatively large pneumatic tire which may have a self-cleaning tread not shown. This wheel is employed to drive the machine.

Around the platform 42 is mounted a U-shaped frame (Figs. 5 and 6) rounded at its forward end and with straight side portions 49 extending rearwardly therefrom and connected by side straps 50 to the platform 42, and with a front bar 51 also connected to said platform. A casing or skirt 52 fits around the forward and side portions of the platform 42 and encloses the upper portion of the front and sides of the wheel and parts thereabove. Within the front of the skirt is mounted a plate 53 having a forwardly extending bottom 54 which rests upon and is connected to a lip 55 of the skirt 52 and provides a container for ballast of sand and or other material 56 in order to add weight to the wheel 46 by means of which the vehicle is driven. The container is provided with an opening 54' and a cover 54" for drainage purposes.

The platform 42 has a post 57 welded thereto and located in a housing 58 secured by U-clamps 59 to the plate 41. At its upper end the steering post is provided with a gear 60 engaged by a worm 61 on a shaft 62 connected by a universal joint 63 with a steering post 64 having a steering wheel 65 on its upper end. A brace 66 is provided for supporting the steering post 64 from the frame of the machine. The housing 58 is supported at its lower end on the platform 42 by means of a thrust bearing 67 a bushing 67' being employed at its upper end. The worm 61 and gear 60 are provided with a conventional split housing 68. For additional strength and to prevent relative rotation of the housing 68 and its mounting a pair of vertical rods 69 are attached to the exterior of the housing in parallel relation and prevent rotation thereof (Fig. 5).

On the platform 42 above the driving wheel 46 is mounted an air-cooled motor 70 utilized to drive the wheel 46. The shaft 71 of the motor is located transversely of the machine and power is taken from the motor shaft at the left side (Fig. 5), drives a split pulley 72 having its near side fixed and its remote side adjustable to and from its near side for increasing the diameter of the pulley for driving with variable speed a belt 73 which drives a second split pulley 74 of similar diameter. The pulley 74 (Fig. 12) is mounted on a shaft 75 connected by transmission 76 with a shaft 77 having a double sprocket 78 which drives a double chain 79 which in turn drives a sprocket 80 of increased size and located on a shaft 81. A small sprocket 82 also mounted on the shaft 81 and drives by a heavier chain 83 a sprocket 84 secured to plate 85 by means of bolts 86. The plate 85 is welded or otherwise attached to the housing 45 for the axle 44 supported by wheel 46. Thus power from the motor is employed to drive the enlarged front or traction wheel of the vehicle. A removable gear shift lever 87 for lever 87' of the transmission 76 normally is kept in a receptacle 88 (Fig. 3) so that it will not be engaged and broken off during the turning of the vehicle through its radius of approximately 90°, permitting turning in smallest space for obvious reasons. The transmission 76 affords a plurality of forward speeds while the split pulleys 72 and 74 and the connecting V-belt 73 increase the variability of the speed of the vehicle or permit the vehicle to be stopped completely (Figs. 13 and 14). In order to operate the pulleys 72 and 74 to vary the diameter of each, bar type operating linkage is connected by a pivot 90 with a bracket 91 fixed to a fixed plate 92 and including a yoke 93 engaging opposite ends of a retainer 96 connected by a suitable bearing with the removable side of the pulley which is keyed on the shaft 71. When the yoke 93, which consists of upper and lower parts, is operated about the pivot 90 it carries the movable side of the pulley 72 with it. When the pulley 72 is moved toward open position it is desirable to move the pulley 74 toward closed position, consequently, a tension rod 94 is extended through the linkage 89 and through a second or additional linkage 95 between the side of which and the end of the bolt is disposed a compression spring 96 (Fig. 5).

The linkage 95 has its ends forming yokes with its end 97 receiving a fixed pivot 99 and its end 98 being its opposite end receiving a pivot 100 on the hub 101 of the movable side of the split pulley 74. The front end of the linkage 89 is connected to a flexible control cable 102 which extends through a sleeve 103 and connects to a lever 104 mounted on a pivot 105 and having a suitable spring pressed pawl for engagement with a ratchet 107 (Fig. 19). The pawl 106 is controlled by a depressable button 108 through a linkage 109 secured to the outer end of the pawl 106 against the action of a spring 106'.

When the lever 104 is swung on its pivot 105 motion is imparted to the linkage 89 to open the pulley 72 and close the pulley 74 by operation of the bolt 94, and vice versa. The degree of opening of the pulleys varies the drive and the speed of the vehicle may be varied from a fraction of a mile to several miles per hour as well as completely stopped either by the operation of the split pulleys or by the transmission 76.

Each of the split pulleys is provided with a bearing so that when the belt reaches the same it will move freely and when the pulley 72 is open the harvester may idle. The movable side of the split pulley 72 is provided with a chamber 111 (Fig. 13) to accommodate the bearing 110 when the sections of the pulleys are brought together. The pulley 74 is of similar construction.

On the end of the motor shaft on which the split pulley 72 is mounted is fixed a pulley 112 which drives a belt 113 and a second pulley 114 (Fig. 6). The pulley 114 is supported on a shaft 115 connected to a flexible cable 116 and a housing 117. The shaft 115 on which the pulley 114 is mounted is carried by a lever 115' mounted on a pivot 116' on the base plate 42, such lever having a release lever 117' which, through a link 118' operates a latch 119' normally held by spring 120' in contact with pin 121' carried by a fixed brace 122 (Fig. 9). Thus, upon operation of the lever the pulley will be swung towards the pulley 112 releasing the belt 113. Guard 113' retains the belt ready for lateral operation. Release of the pulley 114 from the belt 113 likewise frees the flexible shaft 115. The flexible cable 116 extends rearwardly beneath the frame 10 and has attached thereto a worm 118 (Fig. 5) which engages a gear 119 on a shaft 120 disposed transversely of the machine and having sprockets 121 and 122 on each side of the machine by means of which conveyor chains 123 and 124 located at opposite sides of the machine are driven. Each conveyor chain is composed of a series of outside links 125 connected to inside links 126 connected by rivets 127 with spacing sleeves 128. The outside links 125 are provided with center openings 129 in certain of which are disposed mounting pins 130 secured in position by yoke fasteners at one end and with the opposite ends of the mounting pins extending into a sleeve 132 riveted into the upper end of an arm 133 (Figs. 17 and 18).

The lower end of the arm 133 is bent outwardly at right angles and forms one arm or side 134 of a fork or clip, and a second curved side 135 of such fork is secured by a pivot 136 to the base or inner portion of the arm 134. The arm 134 is provided with a lateral portion forming a stop 137 for limiting the movement of the arms toward each other. The arms 134 and 135 are provided with openings 138 and 139 respectively in which the ends of a helical spring are engaged to cause the free ends of the arms to be moved toward each other. Between these arms or within the clip thus formed a plurality of stems of tobacco are adapted to be inserted so that they can be carried along by the conveyor and subsequently removed. To facilitate the operation of these arms they may have contiguous rounded portions and to prevent gumming, bolts or rivets 141 are provided in the ends of the arms on which are mounted two pairs of spaced disks 142, the disks of each pair being disposed in opposite sides of its supporting arm. By using disks which are freely rotatable, gum from tobacco will not accumulate sufficiently to interfere with the operation and does not have to be removed by scraping (Fig. 18).

The conveyor 124 is provided for carrying tobacco from a position near the ground to a higher elevation above the platforms and along an upper run 143 from which the tobacco can be removed and placed on sticks 144. Each conveyor has portions located adjacent the two seats 26 so that tobacco can be placed in the clips or holders by workmen seated on the seats at each side of the machine. In order to dispose the conveyors in the proper position for unloading each is mounted on upper sprockets 145 and 146 so that their upper edges are at the same level. These sprockets are mounted on a Y frame having legs 147 and 148, such Y frame being secured to a base plate 149 secured by U-bolts 17 to tubular cross members 12 and such Y-frame including a depending tube 150 having set screws 151 for engagement with the shank 152 of an adjustable tubular support for the sprocket 153 located near the front seat 26 (Fig. 2).

From the front end of its upper run 143 each conveyor extends downwardly around a driving sprocket by means of which it is driven. From the sprocket 153 the conveyor extends upwardly around a sprocket 154 carried by a bracket 155 which, like the other brackets, is adjustable and is secured to a cross member 12 by means of a U-clamp 17. From the sprocket 154 the conveyor has an inclination downwardly and rearwardly about sprockets 156 and 157 carried on opposite ends of the diverging arms of a bracket 158 which is rigidly mounted on a transverse tubular bar 16. Thus the conveyor extends around driving sprockets 121 and 122 up and over sprockets 145 and 146, down and around sprockets 156 and 157, up and over sprockets 154, down and around adjustable sprocket 153 and then again to the drive sprockets 121 and 122.

The clips with the disks 142 are disposed at spaced intervals alternately on opposite sides of the conveyors and convenient to the workmen or primers near the ground and so that the tobacco leaves from the four rows worked at one time will be uniformly spaced.

Tobacco removed from the upper runs of the conveyor is adapted to be placed on sticks 144 disposed longitudinally of the machine and resting on rotary supports. These supports comprise mounting bars 159 having central openings 160 for pivot pins 161 to which they are fixed, such pins being mounted in stanchions 162 mounted on the platform 13. The outer ends of the pivot pins 161 are provided with sprockets 163 which engage chains 164 and sprockets 165 on a common shaft 166. Thus the arms 159 are mounted and maintained in the same relation. In order to stop the mounting bars in a definite position they are provided with sockets 167 for the reception of the rounded heads 168 of locking pins 169 mounted in the stanchions 162, such pins being provided with adjusting nuts 170 for applying tension to the spring 171 which urges the rounded head 168 of the locking pin into the depression 167 in the arm 159 (Fig. 22).

In order to support tobacco sticks pairs of brackets 172 (Fig. 25) are provided each having a bifurcated end 173 in which the tobacco stick 144 can rest, said bracket also having an upstanding supporting arm 174 mounted on a pivot 175 in the arm 159. The arm 174 of the bracket 172 serves as an abutment against which the ends of the stick may engage. One of these brackets 172 is disposed at each end of the bar 159 and since the bars are in pairs one at each end of the tobacco stick, the stick may be removably supported in opposite positions on the rack. The stick in the uppermost position is adapted to have tobacco strung in depending position thereon and when filled pressure may be exerted to cause the head 168 of the locking pin to move from the socket 167 and permit the stick to swing downwardly with its ends held in opposed brackets whereupon an empty tobacco stick previously applied to the holders of the rack at the lower ends of the bars 159 will be brought into uppermost position where it can be loaded and the process repeated. When the filled sticks are removed they may be stored on racks 176 at the rear of the machine (Fig. 23).

The machine may be adapted for use in setting out or transplanting small plants, such as tobacco, grown in a hot bed until they reach a predetermined size after which they are transplanted. In order to equip the machine as a transplanter, a pair of L shaped supports 177 are provided having horizontal seat portions 178 for supporting a seat 179 fixed to said support by means of U-clamps 180 held together by bolts 181 (Figs. 26 and 27). The supports 177 are held by U-clamps 182 to braces 38 and are maintained in this fixed relation on account of the fact that the upper ends of the supports engage the transverse members 12. Two of the supports 177 are provided in spaced parallel relation.

The seat 178 is disposed centrally behind the front drive wheel and is of a length sufficient to support two workmen side by side but is short enough to pass freely between two rows. An additional workman can be accommodated in each of the seats 26 on the remote side of each of the rows.

The planter comprises a conventional earth displacing plow or drill 183 having a pair of divergent portions 184 to open a furrow into which water is periodically and regularly discharged through a nozzle 185 and at the same time a plant is adapted to be inserted and the earth returned by converging wings or shoes 186 (Figs. 28 and 29).

Water through the nozzle 185 is controlled by a valve 187 (Fig. 30), such water being supplied through tube 188 from a container or tank 189, a control valve 190 being employed for shutting off the discharge of water from said tank.

The valve 187 includes a valve chamber 191 and a valve body 192 having a valve stem 193 reciprocated through linkage 194 and rocker arm 195 mounted on a pivot 196. The rocking of this arm will operate the valve 192 to open and close the same to permit water to flow therethrough.

The shoe or plow 183 is carried by an arm 197 welded or otherwise secured to the tubular shaft 198 and an additional shaft 199 is secured to the auxiliary frame by means of spaced parallel clamping plates 200 (Fig. 27). On the frame member 199 is welded or otherwise secured a bracket 201 which carries the pivot 196 for the rocker arm and a spring 202 tends to attract the lower end of the rocker arm or bias the same in a manner to keep the valve in closed position.

In order to periodically and regularly oscillate the rocker arm, a link or operating bar 203 is secured by a pivot 204 to the upper end of the rocker arm and its opposite end is slidable in the upper end of a bracket 205 fastened by means of a U-bolt 206 on the frame member 198. In order to reciprocate the operating bar 203 it is provided with a slidably adjustable abutment 207 connected by a link 208 having its rear end engaged in an ear or lug 209 of a locking lever 210 connected by a pivot 211 with an adjustable slide 212 on the bar 203. Endwise adjustment of the abutment 207 is obtained on the member 212 by means of a screw 213 threadedly mounted in a bracket 214 attached by a swivel connection with a second bracket 215. In order to provide additional support for the tubular shaft 198, an additional support 216 may be provided having its ends secured by suitable U-clamps 217 to the frame braces 39 and to the tubular shaft 198.

In order to actuate the rocker arm a cam 218 having rollers 219 at its opposite end and supported on the shaft 220 is mounted in a pillow block 221 on a shaft forming a rigid support 222, such rigid support being connected to the tubular shafts 198 and 199. When the cam is rotated in contraclockwise direction one of the bearings 219 will engage the abutment 207 on the bar 203 and move the bearing endwise operating the rocker arm 195 to open the water valve 187. When the cam has moved free of the abutment the spring 202 will close the valve and return the abutment to its initial position (Fig. 29).

In order to rotate the shaft 220 on which the cam 218 is carried, this shaft is provided with a sprocket 223 which is driven by a chain 224 at opposite sides of the machine from the sprocket 122 on the shaft 120, the conveyor chain, when the machine is used as a harvester, having been removed from the sprocket 122. Thus when the transplanter is used it will supply water and wet the soil at spaced intervals and thus the planting can be accomplished.

If desired the machine may be adapted for use in spraying crops either with a powder or a liquid (Fig. 31). In the present instance structure is provided for spraying dust and such structure includes a hopper 225 mounted on a frame 226 attached to the frame 10. Additional braces 227 may be employed for additionally supporting the hopper. A blower 228 is mounted on a shaft 229 and is provided with a series of tangential outlets 230 to each of which is connected a flexible hose 231 and a discharge nozzle 232. A series of such discharge nozzles are located in spaced relation across the rear of the machine and are supported from a bar 233 having pivoted ends 234 for supporting the outermost nozzles, links 235 being employed for fastening the flexible hose to the bar 233 along its intermediate portion. Each end 234 is limited in its downward movement by means of a stop plate 236 and such ends 234 can be raised by means of cables 237 which extend over a portion of the frame.

In order to drive the blower a gear box 238 (Fig. 32) is provided, having gears, not shown, connected to the shaft 229 and such gears being driven by means of a shaft 240 carrying thereon a sprocket 241 driven by a chain 242 which in turn drives a sprocket 124 driven by a sprocket 243 on a shaft 244. On the shaft 244 is the idler sprocket 154 driven by a chain 245 from the rear chain driving sprocket 141, the conveyor chain of the harvester of course having been removed. Thus dusting may be accomplished.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. An agricultural machine comprising a frame, ground engaging means supporting said frame for movement along the ground, a workman supporting platform carried by said frame, a conveyor mounted on said frame for conveying leaves of tobacco or the like from a lower to a higher elevation, said conveyor having at least one run extending downwardly to a position adjacent to the leaves to be conveyed to facilitate the placing of the leaves on the conveyor and having a substantially horizontal run of substantial extent above said platform to facilitate removal of leaves from said conveyor, a series of clips carried by said conveyor for receiving leaves to be conveyed, each clip being pivotally mounted so that it will be disposed in substantially the same angular position on the run which extends adjacent to the leaves where the leaves are placed in the clips and on the substantially horizontal run where they are removed therefrom, means whereby said clips are yieldably urged into leaf holding relation, and means for supporting a workman on said machine closely adjacent to the ground and said downwardly extending run whereby the workman may readily remove leaves from plants for insertion in the clips.

2. An agricultural machine comprising a frame, a traction wheel mounted at one end of said frame for pivotal movement about a substantially vertical axis, ground engaging wheels supporting said frame in spaced relation from said traction wheel, power means for driving said traction wheel, a workman supporting platform carried by said frame, a conveyor mounted on said frame for conveying leaves of tobacco or the like from a lower to a higher elevation, said conveyor having at least one run extending downwardly to a position adjacent to the leaves to be conveyed to facilitate the placing of the leaves on the conveyor and having a substantially horizontal run of substantial extent above said platform to facilitate removal of leaves from said conveyor, a series of clips carried by said conveyor for receiving leaves to be conveyed, each clip being pivotally mounted so that it will be disposed in substantially the same angular position on the run which extends adjacent to the leaves where the leaves are placed in the clips and on the substantially horizontal run where they are removed therefrom, means whereby said clips are yieldably urged into leaf holding relation, and means for supporting a workman on said machine closely adjacent to the ground and said downwardly extending run whereby the workman may readily remove leaves from plants for insertion in the clips.

3. A machine according to claim 2 in which the conveyer is driven from the power means through variable speed control mechanism.

4. A machine according to claim 1 having means for supporting a leaf receiving stick adjacent the horizontal run of the conveyor in a convenient position to receive leaves from said conveyor.

5. A machine according to claim 1 having means for supporting a leaf receiving stick adjacent the horizontal run of the conveyor in a convenient position to receive leaves from the conveyor, said means for supporting the stick including a pair of supporting members mounted in spaced relation for simultaneous rotation about a common axis, and means whereby said supporting members are maintained in a position to support a tobacco stick.

6. A machine according to claim 1 in which the mounting means for said clips is adjustable along said conveyor and including a substantially L-shaped suspending member, and spring means acting on each clip to cause said clip to grip a leaf inserted in said clip.

7. A machine according to claim 1 in which each clip includes means providing a flared mouth for receiving leaves to be conveyed.

8. A machine according to claim 1 in which each clip includes disks disposed in edge to edge relation, and means yieldably urging said disks toward each other whereby upon the application of force to move leaves into and remove leaves from said clips the final portion of the movement will be assisted by said yieldable means.

References Cited in the file of this patent

UNITED STATES PATENTS

| Number | Name | Date |
|---|---|---|
| 350,523 | Bodley | Oct. 12, 1886 |
| 353,716 | Spencer | Dec. 7, 1886 |
| 1,126,696 | Brigham | Feb. 2, 1915 |
| 1,210,056 | Fairman | Dec. 26, 1916 |
| 1,255,790 | Raper | Feb. 5, 1918 |
| 1,275,781 | Stark et al. | Aug. 13, 1918 |
| 1,530,939 | Hawks | Mar. 24, 1925 |
| 1,656,171 | Cox | Jan. 17, 1928 |
| 1,765,469 | Vollink | June 24, 1930 |
| 1,798,028 | Nachtigal | Mar. 24, 1931 |
| 2,267,234 | Garber | Dec. 23, 1941 |
| 2,273,344 | Black et al. | Feb. 17, 1942 |
| 2,477,068 | La Motte | July 26, 1949 |
| 2,506,430 | Melvin, Jr. | May 2, 1950 |
| 2,564,614 | Sowers | Aug. 14, 1951 |
| 2,601,834 | Carter | July 1, 1952 |
| 2,651,405 | McGowan | Sept. 8, 1953 |
| 2,672,248 | Holliday | Mar. 16, 1954 |

FOREIGN PATENTS

| Number | Country | Date |
|---|---|---|
| 425,244 | Great Britain | Mar. 11, 1935 |